Dec. 21, 1965   W. A. MINIX   3,224,251
AIR GAUGE CONTROL
Filed Nov. 25, 1964   2 Sheets-Sheet 1

INVENTOR
WILLIAM A. MINIX
BY Cullen, Sloman & Cantor
ATTORNEYS

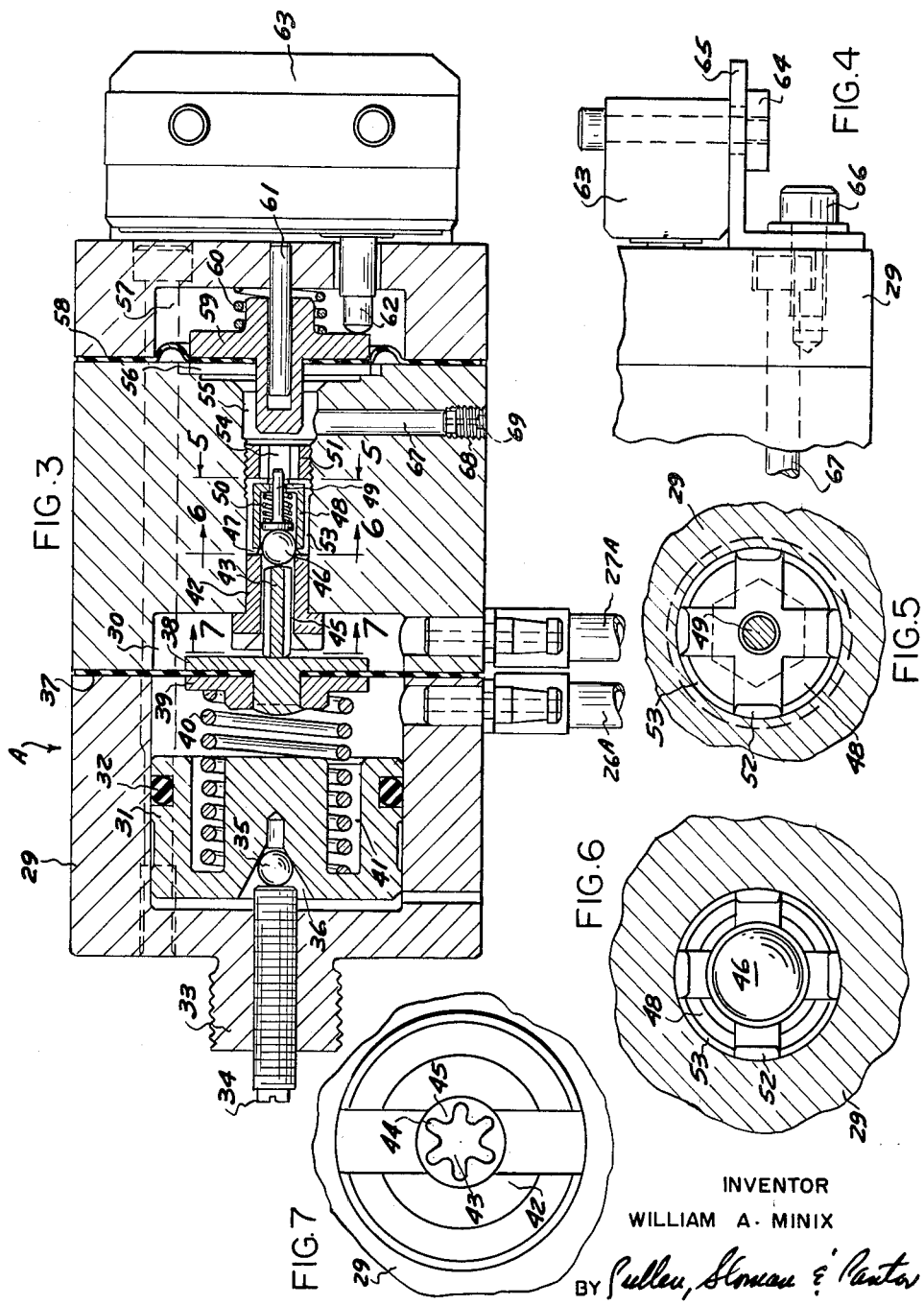

United States Patent Office 3,224,251
Patented Dec. 21, 1965

3,224,251
AIR GAUGE CONTROL
William A. Minix, Detroit, Mich., assignor to Freeland Gauge Company, Detroit, Mich.
Filed Nov. 25, 1964, Ser. No. 413,683
8 Claims. (Cl. 73—37.5)

The present invention relates to air flow gaging devices for gaging the bore of a part and wherein air leakage from a gage head within said bore is visibly measured and compared with air leakage from said gage head within a series of predetermined master bores to provide a range for the selection or rejection of work pieces.

More particularly the present invention is directed to a pneumatic control for the automatic sorting of selected parts corresponding to the master bores in the selected range and wherein automatic control means are activated depending upon a variable reactive intermittent control air pressure in the line to the gage head for energizing one of a series of control mechanisms for operating a sorting device.

It is an object of the present invention to provide pneumatic control mechanism for activating a limit switch connected to one of a plurality of sorting mechanisms. The control device is accurately adjusted so as to respond to a reactive variable intermittent control air pressure from a gaging element in a selective matter whereby a particular control element will not fire unless the gaged part has a measurement within a predetermined to tolerance corresponding to one of a plurality of master bores within an approved range.

It is an object of the invention to provide a series of control elements employed in conjunction with gaging apparatus with each of the control elements separately adjusted so as to respond only upon application of a variable control pressure corresponding to the range of tolerance for a particular one of several master gage bores.

It is another object to provide a pneumatic control mechanism which incorporates an operating chamber with an air pressure responsive flexible movable diaphragm for actuating the plunger of a limit switch; and a second control chamber mounting a second air pressure responsive movable diaphragm for actuating a normally seated valve for permitting the flow of air under a constant pressure to an operating chamber. The control chamber diaphragm is initially biased so as to be in balance with a constant source of pressure. The variable control reactive pressure from the gage element is connected to the control chamber for operation in conjunction with the second diaphragm bias providing an upset of said balance and momentary unseating of the control valve.

These and other objects will be seen from the following specification and claims in conjunction with the appended drawings in which:

FIG. 3 is a longitudinal section on an enlarged scale of one of the control elements.

FIG. 4 is a fragmentary side elevational view of the mounting of a limit switch upon control element housing.

FIG. 5 is a fragmentary section taken in the direction of arrows 5—5 of FIG. 3.

FIG. 6 is a fragmentary section taken in the direction of arrows 6—6 of FIG. 3.

FIG. 7 is a fragmentary section taken in the direction of arrows 7—7 of FIG. 3.

FIG. 8 is a front elevational view of a master which is one of a series employed.

FIG. 9 is a side elevational view thereof.

Figure 1:
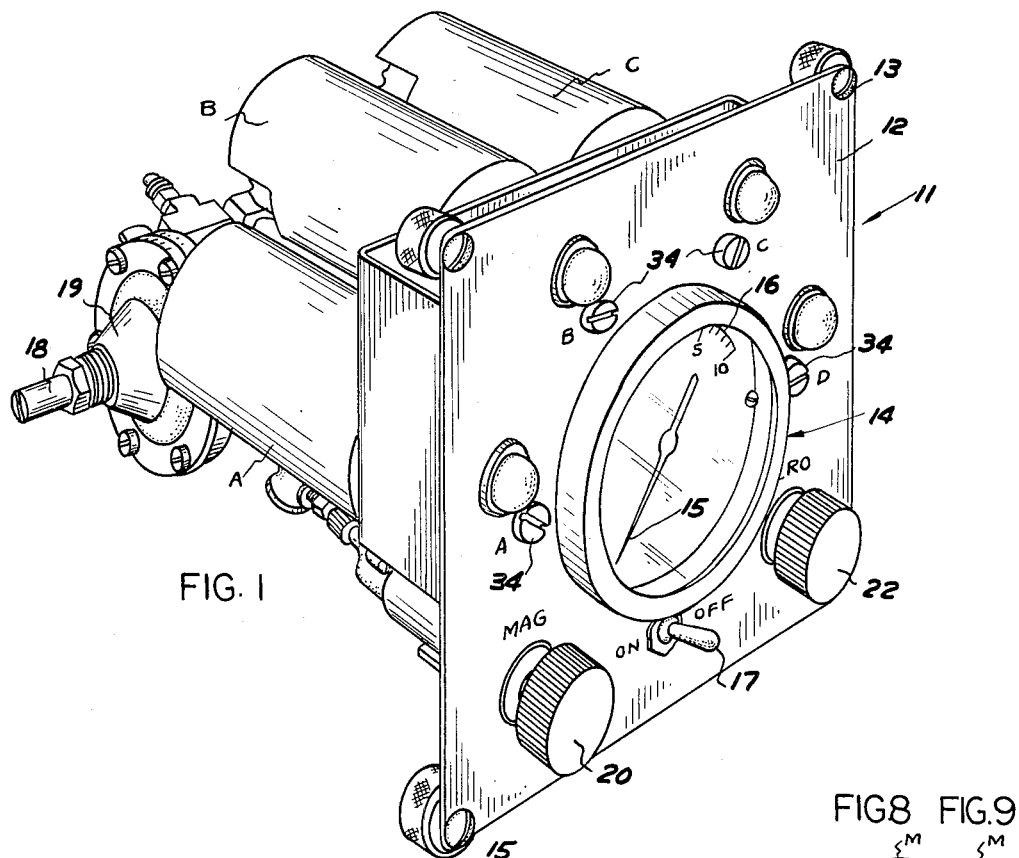
FIG. 1 is a front perspective view of the present pneumatic control apparatus incorporating an air gage assembly and a series of control elements.

Referring to the drawing, the present air gage control apparatus 11, FIG. 1, includes a support plate 12 with mounting fasteners 13.

The gage has an air pressure dial indicator 14 with needle 15 responsively movable relative to calibrations 16, and a manual off and on switch 17 for controlling communication of air under pressure from conduits 18 and 21 to indicator 14.

Figure 2:
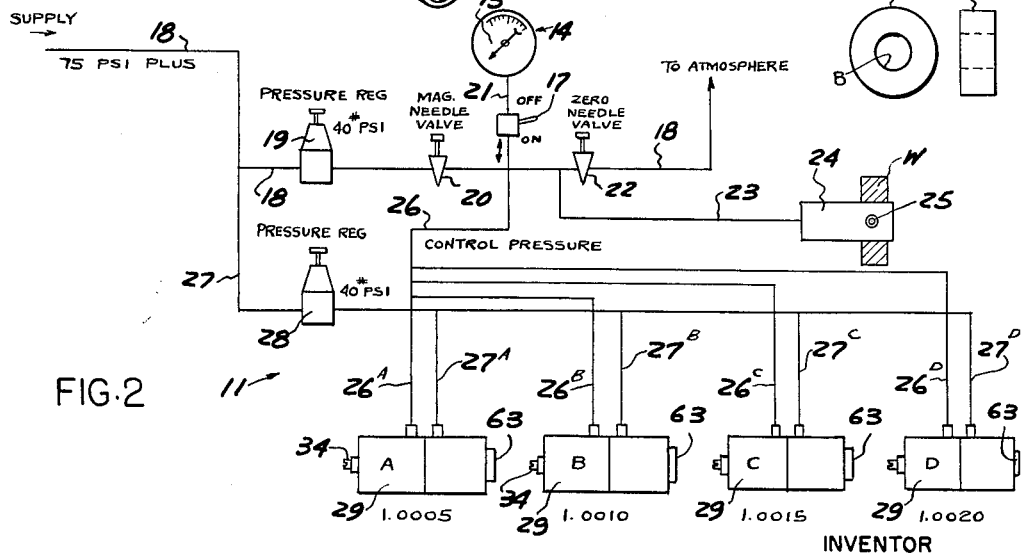
FIG. 2 is a schematic diagram of the pneumatic connections between the gage apparatus and the control elements.

Referring to FIG. 2, a supply of air is delivered to conduit 18 at, for illustration, 75 p.s.i. for connection with pressure regulator 19, which in the illustrative embodiment is set at 40 p.s.i, for delivering a constant flow of air under pressure through magnification needle valve 20 regulating flow of air to conduit 21, and to the zero air bleed control needle valve 22 and thence to atmosphere. In air line 18 between valves 20 and 22 there is connected an air delivery conduit 23 which joins gage head 24 having orifices 25 adapted for registry with the bore of a work piece W. A ring master M is shown in FIGS. 8 and 9, being one of several in a predetermined tolerance range. Each includes a bore B for comparison with the bore of work piece W.

In the normal operation of air leakage gages of the type shown in FIG. 2, air leakage from gage head 24 within the bore of work piece W is visibly measured and compared with air leakage from said gage head 24 within a series of predetermined master bores of a series of masters M. This provides a range for the selection or rejection of work pieces employing for illustration four ring masters indicating a "go" range of acceptable bores. These masters will have diameters, for example, of 1.0005 inches; 1.0010 inches; 1.0015 inches and 1.0020 inches, FIG. 2. This indicates, for example, the full range of acceptable bores for work pieces outside of which the work piece is rejected.

The amount of air bleeding from head 24 within work piece W in or out of the acceptable range will depend upon the bore tested. This bleeding will vary and will provide in air lines 18 and 23 an intermittent variable reaction control air pressure. This control pressure is used for the actuation of one of a series of pneumatic control elements A, B, C, D depending upon its setting so as to respond to air pressure to cause firing or activation of the particular pneumatic control element. These respective control elements are indicated at A, B, C, and D, FIG. 2. A separate conduit 26A, 26B, 26C, and 26D joins line 26 and connects the main air line 18 in communication with the air pressure indicator 14. There is thus transmitted respectively to each of the control elements A, B, C, and D the variable reactive intermittent air control pressure in line 18 provided by the amount of air leakage at head 24.

Due to the different setting of each of the control elements A, B, C, and D, only one thereof will be activated or "fire" for actuating one of a series of sorting devices. This is accomplished, for illustration, by an electrical control such a limit switch which actuates a solenoid, for example, and which controls the operation of a gate. Thus a gauged part goes in one direction or another and is thus sorted, since there are normally a series of such gates, operated selectively by the respective control mechanism A, B, C, and D. Thus the part corresponding to the particular range defined by the masters possibly all within the "go" area can be separately sorted according to their correspondence with a particular master bore. Thus, this variable control pressure is transmitted through the respective branches 26A, 26B, 26C and 26D to each of the control chambers 30 of the control elements, FIG. 3.

Each of the control elements A, B, C and D have a housing 29, provided with a source of air under constant pressure. Line 27 from main air line 18, FIG. 2 connects pressure regulator 28 set for illustrations at 40 p.s.i., and through the respective branches 27A, 27B, 27C and 27D delivers constant air pressure to the respective control chambers 30, FIG. 3.

Since the variable reactive pressure in line 23 will vary depending upon the size of the work piece bore with respect to the series of masters, this variable control pressure will be transmitted back through line 26 to each of the control chambers of the series of control devices 29. However, due to the setting of the initial bias upon the diaphragm 37 within control chamber 30, only one of the four control elements will respond to operate an electrical device.

These control elements 29 are individually mounted upon the rear surface of support 12, FIG. 1, to provide a complete unit. One of the said control elements is described with respect to FIGS. 3 through 7.

*Pneumatic control element*

The present control element includes housing 29 having adjacent one end control chamber 30 with the longitudinally adjustable piston 31 sealed therein at 32. Mounting boss 33 has a threaded bore to receive manually adjustable screw 34 which projects into the control chamber and operatively engages ball 35 within cone shaped recess 36 upon one side of piston 31 for controlling longitudinal adjustment of said piston.

A flexible axially movable diaphragm 37 of rubber or equivalent is sealed within control chamber 30. Centrally mounted upon said diaphragm is an axially arranged actuator 38 having a central portion which projects through the diaphragm and mounts retainer 39 engaging one end of compression spring 40. The opposite end of said spring is nested and retained within bore 41 of piston 31. Spring 40 provides an initial bias upon one side of diaphragm 37 tending to flex its central portion axially to the right, FIG. 3.

Adjacent the opposite end of housing 29 is an operating chamber 57; and interconnecting chambers 30 and 57 is an axial bore 55.

A normally closed valve assembly is mounted within bore 55 and includes the flanged valve seat 42, a portion of which extends into control chamber 30. The valve seat has an axial bore within which is loosely and movably positioned the control rod 43 which has a series of peripheral elongated flutes 44 defining a series of air passages 45, FIG. 7.

The valve assembly includes ball 46 normally seated at 47 within the bushing 48. Ball 46 is biased to seated position by flanged stem 49 and compression spring 50 upon the interior of said bushing preventing the flow of air under pressure through bore 55.

The bushing 48 is retained within said bore by retainer screw 51 whose bore 54 provides communication into chamber 56 relative to the transverse flexible diaphragm 58, sealed across operating chamber 57. Bushing 48 has a series of elongated spaced peripheral portions 52 defining the elongated air channels 53 communicating bores 54 and 55.

Actuator 59 is axially secured to and projects through diaphragm 58 and has a bore which cooperatively receives guide pin 61 anchored to the housing.

Coil spring 60 is mounted around a portion of actuator 59 and at one end bears against housing 29 within control chamber 57 and provides an initial bias to the left of the central portion of diaphragm 58 normally resisting movement of actuator 59 in the opposite direction.

The limit switch or other control switch 63 adapted for connection to any type of sorting mechanism, for illustration, is fastened at 64 to bracket 65, FIG. 4, anchored at 66 upon housing 29. Limit switch 63 includes an actuating plunger 62 which extends through the wall of the housing and into operating chamber 57 and is in operative engagement with actuator 59; and thus responds to flexing movement of diaphragm 58 to the right from the position shown in FIG. 3.

Radial exhaust passage 67 inter-connects one end of bore 55 adjacent diaphragm 58 with the atmosphere. Bleed plug 68 is positioned within passage 67 and includes an air bleed orifice 69 to permit the gradual escape of accumulated air within bore 55.

Referring to FIG. 2 a supply of air under constant pressure, such as forty p.s.i. is directed through conduits 27A, 27B, 27C and 27D to control chamber 30 upon the side of diaphragm 37 opposite from its biasing spring 40.

In setting up control element A an initial balance is established between the constant air pressure supplied through conduit 27A into chamber 30 and the spring bias applied to said diaphragm from its opposite side through manual adjustment of screw 34.

*Operation*

In the initial set up of the control element with constant pressure applied to chamber 30, the bias through spring 40 and piston 31 is sufficient to balance diaphragm 37 and actuator 38 to maintain control rod 43 operatively so as not to unseat biased ball 46. By regulating screw 34 and piston 31 the compression and sensitivity of spring 40 may be regulated.

The variable reactive intermittent control air pressure in line 23 is delivered through the conduit 26 or the respective branch conduits 26A, 26B, 26C, 26D to the side of the diaphragm 37 within the control chamber 30 corresponding to its biased side or adjacent spring 40. Upon application intermittently of this variable reactive control pressure to chamber 30 there is created a temporary imbalance upon diaphragm 37 which flexes to the right of FIG. 3 and actuator 38 axially moves control rod 43 to unseat ball 46. For a very short period the air under pressure of 40 pounds p.s.i. in chamber 30 will move through passages 45, through bore of valve seat 42, through passages 53 and thence through bores 54 and 55 into chamber 56, forming a part of the operating chamber 57. This causes flexing to the right of diaphragm 58 against spring 60. This causes a corresponding axial movement of actuator 59 and a momentary actuation of plunger 62 of limit switch 63.

Any build up of air within bore 55 escapes through exhaust passage 67 and air bleed plug 68. Just as soon as this variable reactive intermittent control air pressure is relieved from conduit 26, FIG. 3, the air compressed within chamber 30 will cause diaphragm 37 to flex axially to the left against the action of spring 40 until the diaphragm has assumed the neutral position shown. Ball 46 is again seated closing off further flow of compressed air through bore 55 to control chamber 56.

By adjustment of manual control screw 34 shown in FIG. 1 on support plate 12, a very sensitive balance can be created between the initial bias applied through spring 40 to diaphragm 37, and the constant air pressure in chamber 30 delivered through conduit 27.

By adjusting screw 34 of control device A, FIGS. 2 and 3, the amount of reactive air pressure through conduit 26A which will be sufficient to overcome the balance of diaphragm 37 in control chamber 30 may be varied. By similarly adjusting all four of the separate control elements A, B, C and D, it is seen that a variable reactive control pressure of one degree could cause an imbalance of the control diaphragm in control chamber 30, insufficient to create an imbalance in control member A but sufficient to create an imbalance in control member B in the set up shown in FIG. 2.

Successively then, each of the adjusting screws 34 of the respective control device A, B, C, and D will have a different bias pressure of such sensitivity that only one of the four control mechanism A, B, C and D will be activated in the gaging of one particular bore of a part with all the other control devices momentarily rendered ineffective. This provides a device by which even in the "go" range or acceptable range of bores the parts may be sorted since the control mechanism responding to a particular bore and corresponding master will operate only one of the series of limit switches 63 or other switching mechanism for operating an individual sorting device electrically.

This is particularly true because the reactive pressure delivered to the conduit 26, namely through any of the branches 26A, 26B, 26C or 26D will vary depending upon the amount of air bleeding which occurs at gage head 24 in its application to a particular work piece. For example, all the bores may be in the "go" zone or all acceptable. However, activation of the B control unit would indicate a bore corresponding to a master of one 1.0010 inch for sorting in one category whereas actuation of the control device D with a different control pressure because of the increased clearance of head 24 with respect to a work piece bore operates a different control mechanism. That particular work piece as tested would then be mechanically sorted since the present pneumatic control device operates selectively any one of the four limit switches 63.

Upon support 12 adjacent each of the respective adjusting screws 34 corresponding to the individual control devices A, B, C, and D, FIG. 1, there is a bulb respectively indicated at A, B, C, and D corresponding to and indicating when lighted the actuation of a particular control element A, B, C or D.

Having described my invention reference should be had to the following claims.

I claim:

1. In an air gage providing a variable reactive control air pressure; a limit switch for actuating a gaged part sorting device and including a plunger;
   a housing mounting said limit switch and including an operating chamber into which said plunger movably extends;
   a first flexible and axially movable diaphragm sealed within said chamber;
   an actuator on said diaphragm normally biased to resist movement of said diaphragm in one direction and movable therewith and operatively engageable with said plunger;
   there being a control chamber in said housing;
   a second flexible and axially movable diaphragm sealed within said control chamber; there being a passage interconnecting said chambers;
   a normally closed movable valve seated in said passage closing communication between said chambers;
   an actuator upon said second diaphragm;
   an axial control rod guidably mounted upon said housing axially movable therein and interposed between and engaging said valve and latter actuator, adapted for unseating said valve;
   a source of air at a preset constant pressure connected to the control chamber on one side of the second diaphragm adapted for communication with said passage;
   an axially adjustable piston on the other side of said second diaphragm sealed within the control chamber;
   spring means interposed between said piston and said second diaphragm for providing a balancing pressure upon said other side of said second diaphragm whereby said valve is normally seated;
   and adjustable screw means on said housing at one end operatively engaging said piston and at its other end projecting from said housing to facilitate manual adjustment;
   said variable reaction control air pressure being connected to said control chamber upon the piston side of said diaphragm for variably creating with said spring means a pressure inbalance acting upon said second diaphragm moving the same to momentarily unseat said valve, said source of air under constant pressure moving said first diaphragm against its bias to actuate said limit switch.

2. In an air gage providing a variable reactive intermittent control air pressure in an air line;
   a limit switch for momentarily activating a sorting device for gaged parts and including a plunger;
   a housing mounting said limit switch and including an operating chamber into which said plunger movably extends;
   a first flexible and axially movable diaphragm sealed within said chamber, normally biased to resist movement in one direction and adapted upon such movement for operative engagement with said plunger; there being a control chamber in said housing;
   a second flexible and axially movable diaphragm sealed within said second control chamber normally biased from one side for movement in one direction; there being a bore in said housing interconnecting said chambers;
   a biased normally closed movable valve seated in said bore closing off communication between said chambers;
   a control rod guidably mounted within said bore and axially movable therein and interposed between and engaging said valve and the second diaphragm for unseating said valve on movement of the latter diaphragm in said one direction;
   a source of air at a preset constant pressure connected to the control chamber on one side of the second diaphragm adapted for communication with said bore; normally opposing the bias of said second diaphragm and in balance therewith;
   said air line with its variable reaction control air pressure being connected to said control chamber upon the opposite side of said second diaphragm for variably creating a pressure imbalance acting upon said second diaphragm for moving the same to momentarily unseat said valve;
   said source of air under constant pressure moving said first diaphragm to actuate said limit switch plunger.

3. In the air gage of claim 2, an actuator on said first diaphargm operatively engageable with said plunger;
   and an actuator on said second diaphragm operatively engageable with said control rod.

4. In the air gage of claim 2, an actuator on said first diaphragm operatively engageable with said plunger;
   and an actuator on said second diaphragm operatively engageable with said control rod, the actuator on the first diaphragm being guidably and movably mounted upon said housing.

5. In the air gage of claim 2, the bias for said second diaphragm being variable and including an axially adjustable piston on one side of said second diaphragm and sealed within said control chamber;
   spring means interposed between said piston and said second diaphragm, in balance with the constant air pressure upon its other side;
   and an adjustable screw means on said housing at one end operatively engaging said piston and at its other end projecting from said housing to facilitate manual adjustment thereof.

6. In the air gage of claim 2, said valve including an elongated passage terminating at one end in a seat;
   and a ball biased against said seat;
   said control rod loosely nested in said valve passage and having a series of elongated flutes in its outer surface and extending its full length for the passage of said air under contant pressure.

7. In the air gage of claim 2, there being a transverse exhaust passage in the housing interconnecting said bore adjacent the first diaphragm with the exterior of the housing;
   and an air bleed plug in said exhaust passage.

8. In an air flow device for gaging the bore of a part, wherein air leakage from a gage head within said bore is visibly measured and compared with air leakage from said gage head within a series of predetermined master bores, providing a range for the selection or rejection of work pieces;
- a pneumatic control for the automatic sorting of selected parts corresponding to the master bores in the selected range;
- a support;
- a gage body mounted on the support and including an air pressure indicator;
- a source of air under regulated constant pressure connected to the gage body for communication with the said indicator;
- a gage head having an orifice;
- a conduit between said gage body and gage head;
- the application of said head to a bore permitting variable air bleeding from said head depending upon the bore size;
- such bleeding providing a variable reaction intermittent control air pressure in said conduit;
- a series of separate control elements, each individually adjusted for firing and selective operation of a part sorting device depending upon correspondence of the bore tested with one of the series of corresponding master bores;
- each control element comprising a limit switch for momentarily activating a sorting device and including a plunger;
- a housing mounting said limit switch including an operating chamber into which said plunger movably extends;
- a first flexible and axially movable diaphragm sealed within said chamber, normally biased to resist movement in one direction and adapted upon such movement for operative engagement with said plunger; and there being a central chamber in said housing;
- a second flexible and axially movable diaphragm sealed within said control chamber normally biased from one side for movement in one direction; there being a bore in said housing interconnecting said chambers;
- a biased normally closed movable valve seated in said bore closing off communication between said chambers;
- a control rod guidably mounted within said bore and axially movable therein and interposed between and engaging said valve and the second diaphragm for unseating said valve on movement of the latter diaphragm in said one direction;
- a source of air at a preset constant pressure connected to the control chamber on one side of the second diaphragm adapted for communication with said bore; normally opposing the bias of said second diaphragm and in balance therewith;
- said air line with its variable reaction control air pressure being connected to said control chamber upon the opposite side of said second diaphragm for variably creating a pressure imbalance acting upon said second diaphragm for moving the same to momentarily unseat said valve;
- said source of air under constant pressure moving said first diaphragm to actuate said limit switch plunger.

No references cited.

LOUIS R. PRINCE, *Primary Examiner.*